May 27, 1969

J. R. DIVER 3,446,474

HYDRAULIC PILOT VALVE

Filed July 31, 1967

Inventor:
John R. Diver
By: Robert L. Zieg  Atty.

United States Patent Office 3,446,474
Patented May 27, 1969

3,446,474
HYDRAULIC PILOT VALVE
John R. Diver, Lake Forest, Ill., assignor to Borg-Warner Corporation, Chicago, Ill., a corporation of Illinois
Filed July 31, 1967, Ser. No. 657,404
Int. Cl. F16k *31/02, 39/00*
U.S. Cl. 251—141                                8 Claims

ABSTRACT OF THE DISCLOSURE

An electro-magnetically actuated hydraulic pilot valve mechanism having a poppet valve overbalanced to a normally closed position by hydraulic pressure acting on a differential area in conjunction with a spring biasing force, the valve being magnetically actuatable to open position.

Summary of the invention

The invention comprises an improved hydraulic pilot valve in which pressure forces act on both ends of a poppet valve and an overbalance of force at one end is effective to hold the valve in a normally closed position. The pilot valve is electro-magnetically operated and the magnetic force is exerted directly on the poppet valve so that the poppet valve acts both as a valve and an armature.

Figure 1:
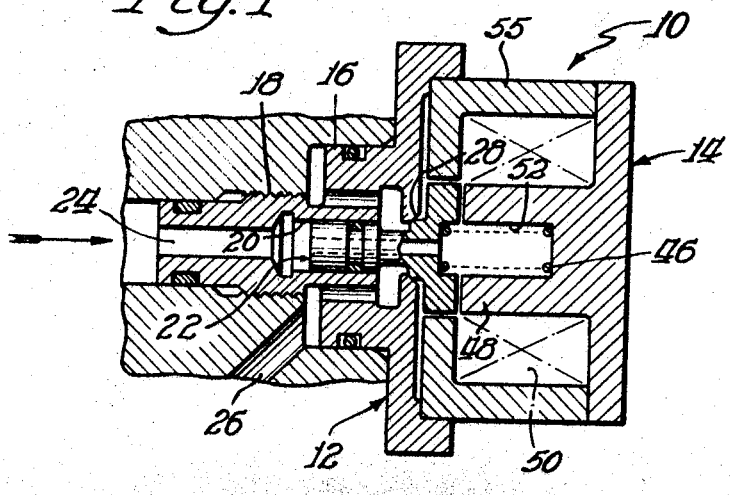
Figure 2:
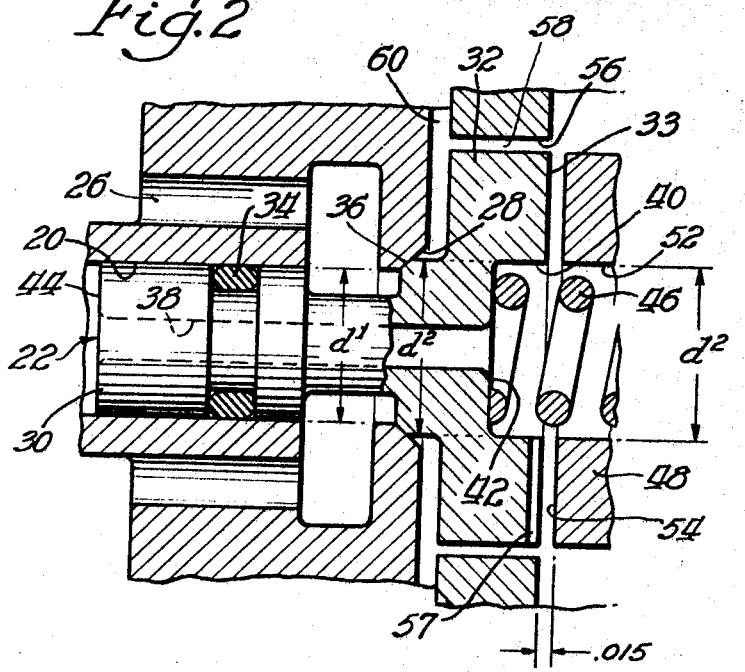

Other objects and advantages of the invention will be more readily apparent when read in conjunction with the accompanying drawings in which:

FIGURE 1 is an elevational view partially in section showing a valve embodying the principles of the invention and showing the valve in a closed position; and FIGURE 2 is an enlarged partial view in section of the valve in FIGURE 1.

Referring now to the drawings, the hydraulic pilot valve assembly generally is designated by the numeral 10. The valve assembly 10 comprises a valve mechanism 12 and a solenoid actuator 14. The valve mechanism 12 comprises a valve body 16 which has formed at one end thereof an elongated threaded boss 18 for connection to a hydraulic pressure system. A bore 20 is formed in the valve body 16 for slidably receiving therein a piston-type poppet valve 22 which normally will be in a closed position. An inlet passage 24 in the boss 18 communicates with the bore 20. Passage means 26 is also formed in the valve body 16 forming an outlet to drain. A valve seat 28 is formed at the right end of bore 20 upon which the poppet valve 22 is seated.

The poppet valve 22 is substantially T-shaped, being formed with a cylindrical poppet valve spool 30 and an enlarged cylindrical poppet head 32. The poppet valve spool 30 is fitted with sealing means 34 and is slidable in the bore 20. A valve face 36 is formed on the spool intermediate the ends of the poppet valve 22 and is adapted to seat on valve seat 28.

An axial passage 38 extends through the valve spool 30 and poppet head 32. In the assembly, axial passage 38 is in communication with the inlet passage 24 and bore 20.

The poppet head 32 has a counterbore 40 formed therein into which axial passage 38 extends. Counterbore 40 forms a transverse surface 42 at a right angle to axial passage 38. The diameter of the poppet head 32 near valve face 36 is designated $d^2$ and is slightly larger than the diameter $d^1$ of the poppet valve spool 30. Thus the area of transverse surface 42 (also having a diameter $d^2$) of counterbore 40 is larger than the area of a transverse surface 44 on the left end of the poppet valve disposed immediately adjacent the inlet passage 24. The difference in the areas of transverse surfaces 42 and 44 represents the differential area subject to fluid pressure from inlet passage 24. The fluid pressure acting on this differential area causes an overbalance of force on the poppet valve 22 and causes poppet valve 22 to assume a normally seated or closed position. Counterbore 40 has seated therein one end of a compression ring 46. The poppet head 32 is an enlarged annular head of magnetically permeable material which overlaps a portion of the valve body 16 which is adjacent the righthand portion of the bore 20. Poppet head 32 serves as an armature and has a surface 33 formed thereon on the side opposite to valve spool 30.

The solenoid actuator 14 connected to suitable electrical means for energization comprises a centrally disposed pole piece 48 surrounded by a solenoid coil 50. A cavity 52 is formed in the pole piece 48 and is disposed in substantial alignment with the counterbore 40. The spring 46 is positioned under compression in the cavity 52 and counterbore 40 and provides a slight force tending to urge the poppet valve 22 into a seated position. The pole piece 48 has a surface 54 formed thereon which is adapted to contact the surface 33 of the poppet head 32 when the solenoid coil 50 is energized and the poppet head is drawn against the pole surface 54. A suitable casing 55 is provided to house the solenoid coil 50 and pole piece 48, and the casing 55 is connected to the valve body 16 by suitable means. The casing 55 is formed with a central opening 56 surrounding the poppet head 32 and is radially spaced therefrom to provide a circumferential passage 58 between the casing 55 and poppet head 32. A space 60 with which passage 58 communicates is defined by valve body 16, poppet head 32, and casing 55.

When poppet valve 22 is in a seated position, the air gap distance between the surface 33 of the poppet head and surface 54 of the pole piece is approximately .015. The surface 33 of the poppet head 32 or the surface 54 of pole piece 48 or both the surfaces 33 and 54 are formed with a series of radially extending grooves 57 extending between cavity 52 and passage 58 which permit pressure fluid to flow between the two faces when the solenoid coil 50 is energized and lifts valve 22 from its seat to an open position.

When the poppet valve 22 is seated, pressure fluid acts on the surface 44 of valve 22 and on the larger surface 42 at the opposite end of valve 22, the force on the differential area tending to keep the valve closed. At the same time, pressure fluid surrounds the poppet head 32, the space between surfaces 33 and 54, passage 58 and space 60 being filled.

It will be observed that the poppet head 32 and pole piece 48 are of relatively large diameter in relation to the rest of the valve unit. This rather large diameter and small air gap permit a substantial concentration of magnetic flux in the air gap thus providing a substantial magnetic force for lifting poppet valve 22 from its seat 28.

When the solenoid is energized, the poppet head 32 acts as an armature, the poppet valve 22 is moved from its seat and the two surfaces 33 and 54 come in contact. Then pressure fluid passes through grooves 57 down through passage 58 surrounding the poppet head, through space 60, between valve seat 28 and valve face 36, and through passage means 26 to the drain. Upon deenergization of the solenoid coil 50, the force on the differential area plus the force exerted by spring 46 closes the valve 22.

The valve herein disclosed may be used in low and high pressure hydraulic systems, ranging all the way up to 5000 p.s.i., for example, and may serve as a pilot control for larger pilot operated valves. It will be observed that the valve assembly 10 is compact and that the single poppet valve 22 advantageously serves the dual function of an armature and a flow control element.

I claim:

1. In a hydraulic valve mechanism the combination comprising:
a valve body having a fluid inlet and fluid outlet; bore means in said valve body, said bore means being in communication with said fluid inlet; a valve seat associated with said bore means; a poppet valve slidably disposed in said bore and adapted to have fluid pressure act on opposite ends thereof; a complementary valve face on said poppet valve to coact with said valve seat to control the flow of pressure fluid from said inlet to said outlet; means for establishing fluid communication to opposite ends of said poppet valve, said means comprising a passageway formed in said poppet valve through which all pressure fluid moving from inlet to outlet must flow; means for applying a greater force at one end of said poppet valve than at the other whereby said poppet valve is urged to a normally closed position; and solenoid actuator means associated with said poppet valve for lifting said poppet valve from its seat.

2. The combination of claim 1 wherein said means for applying a greater force at one end of said poppet valve than at the other comprises a differential area upon which fluid pressure is adapted to act, said differential area representing the difference between the surface areas on said poppet valve against which fluid pressure acts to move said poppet valve in opposite directions.

3. The combination of claim 2 including spring biasing means for urging said poppet valve to a closed position.

4. The combination of claim 1 wherein said means for applying a greater fluid force at one end of said poppet valve than at the other comprises means defining surfaces at opposite ends of said valve having different areas whereby fluid pressure acting on the surface having the larger area is effective to hold said poppet valve in a closed position.

5. The combination of claim 1 wherein said poppet valve is substantially T-shaped having a head section and a spool section, said spool section being slidably disposed in said bore means, and said head section being disposed adjacent said solenoid actuator means to serve as an armature.

6. The combination of claim 5 including sealing means on said spool section to prevent leakage of pressure fluid directly from said inlet to said outlet.

7. The combination of claim 1 wherein said poppet valve has formed thereon a head section, said head section functioning as an armature, and said solenoid actuator means includes a pole piece disposed adjacent said poppet valve head section for magnetically attracting said head section, and said head section includes means defining a surface thereon against which inlet fluid pressure is adapted to act to urge said valve to a closed position, said surface being larger in area than the end of said poppet valve disposed immediately adjacent the inlet.

8. The combination of claim 1 wherein said poppet valve both controls the flow of pressure fluid from inlet to outlet and functions as an armature of the solenoid actuator means.

References Cited

UNITED STATES PATENTS

| | | | |
|---|---|---|---|
| 1,321,673 | 11/1919 | Sayward | 137—450 |
| 1,587,921 | 6/1926 | Ray | 251—141 X |
| 1,720,705 | 7/1929 | Waterman | 251—282 X |
| 2,307,949 | 1/1943 | Phillips | 251—282 X |
| 3,009,678 | 11/1961 | Soderberg et al. | 251—282 X |
| 3,329,158 | 7/1967 | Geiszler | 251—282 X |

M. CARY NELSON, *Primary Examiner.*

M. O. STURM, *Assistant Examiner.*

U.S. Cl. X. R.

251—175, 315